Patented Oct. 14, 1947

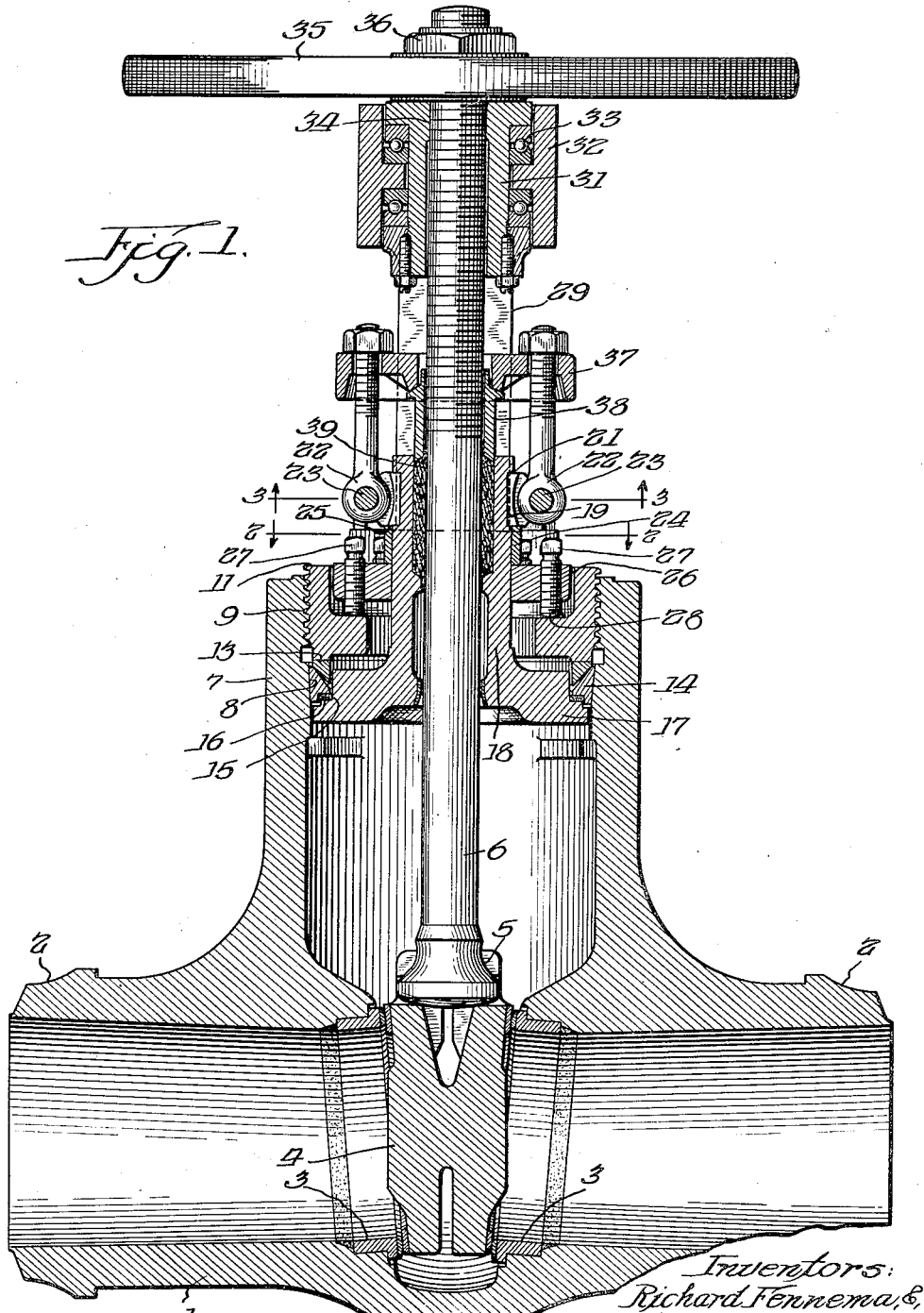

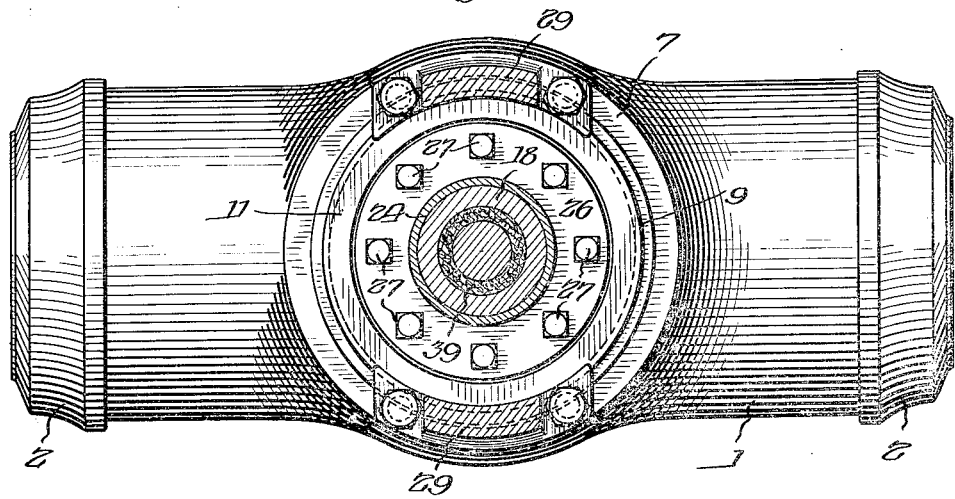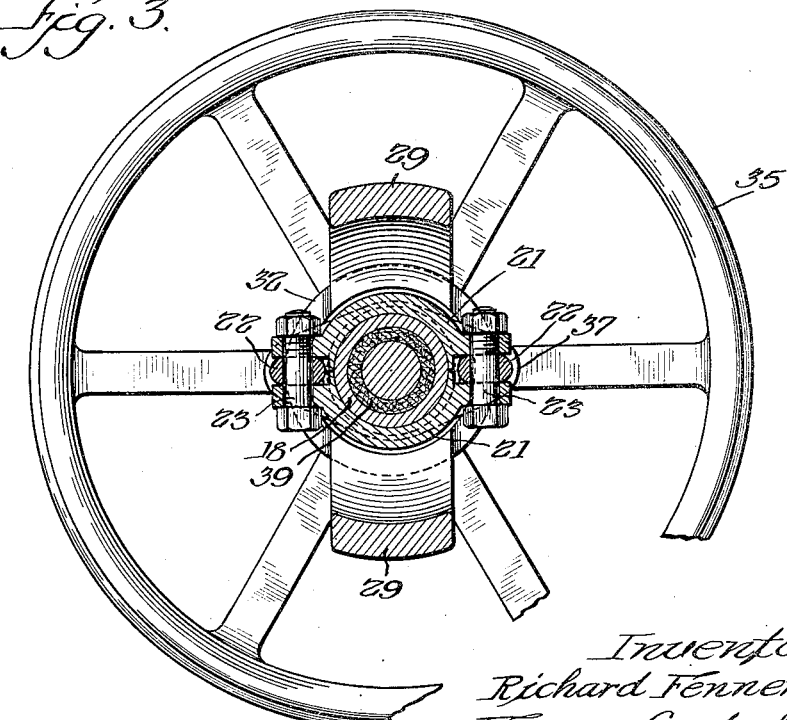

2,428,963

UNITED STATES PATENT OFFICE 2,428,963

MOUNTING FOR PRESSURE SEALED JOINTS

Richard Fennema and Francis J. Cantalupo, Chicago, Ill., assignors to Crane Co., Chicago, Ill., a corporation of Illinois Application April 19, 1945, Serial No. 589,118

10 Claims. (Cl. 220—46)

This invention relates to a novel mounting and more particularly it pertains to a mounting for pressure sealed joints. It is especially concerned with the type of joint shown in U. S. Patent No. 2,330,130, granted September 21, 1943, this invention constituting an improvement thereover as hereinafter more specifically explained.

One of the more important objects is to provide a mounting for a pressure sealed joint in which the bolts heretofore used for drawing the bonnet or other form of closure against the retaining gasket are substantially removed from the zone of extremely high temperatures. Since this type of joint as such is particularly suitable for high temperature service and is so recommended by most users, it has been the subject of considerable question as to the advisability of even subjecting high temperature bolts or studs to the excessively severe temperatures normally encountered. By this invention, such objectionable bolt exposure has now been satisfactorily overcome.

A further object is to provide a construction in which the arrangement of studs or bolts used permits locating such latter retaining means relative to the bonnet in a position where the likelihood of stud seizure is eliminated, and thereby avoiding a substantial amount of the inconvenience heretofore encountered when on many occasions it was virtually impossible to remove the seized bolts or studs from the bonnet when disassembly for inspection or repair became necessary.

A further object is to provide for an assembly of mounting parts as hereinafter described in which such assembly is facilitated because the bolts or studs may be applied without groping for the stud location in the bonnet as heretofore provided.

A further object is to provide a mounting construction in which even in the event of the breakage of a bolt or a stud such breakage will not interfere with the removal of the retaining ring or the like employed in this type of service. It should be understood that in previous constructions breakage of the stud or bolt anywhere within the retaining ring prevented removal of the latter member and obviously created considerable inconvenience and expense.

Other objects and advantages will become more readily apparent in connection with the reading of the specification considered in light of the accompanying drawings, in which Fig. 1 is a sectional assembly view of a valve employing our invention.

Fig. 2 is a sectional view taken on the line 2—2 of Fig. 1.

Fig. 3 is a sectional view taken on the line 3—3 of Fig. 1.

Similar reference characters refer to similar parts throughout the several views.

Referring now to Fig. 1, a conventional valve body or casing generally designated 1 is shown having the usual connecting ends 2 as for example of the type suitable for a weld connection with a pipe line and fitted with body seat rings 3 for reception of a closure member 4 having a T head connection 5 with a stem 6 reciprocably movable for opening and closing the valve in the usual manner. The upper portion of the casing 1 is provided with the indicated bonnet extension 7, the latter portion being taper bored as at 8 and provided with the threads 9 for engagement of the retainer ring 11, the latter member bearing against the pair of gaskets mounted in superposed relation and designated 13 and 14 respectively, to thereby compress the flexible gasket member 15 which is annularly shouldered at 16 upon a bonnet generally designated 17, all of which detailed construction is in accordance with the novel details in the Fennema pending patent application, Serial No. 589,117, filed April 19, 1945. The bonnet 17 is provided with an upwardly extending portion 18 about which is mounted as at 19 the split packing gland assembly 21 and upon which the eye-bolts 22 are pivotally mounted as shown at 23. Preferably below the split collar 21 the collar or spacer ring 24 is mounted so as to bear against the lower end portion of the split collar 21 as indicated at 25. Immediately below the collar ring 24 is positioned the stud retaining ring member 26 tapped to receive a plurality of set screws or studs 27 which serve thus to support the seat ring member 26 by providing for such studs to shoulder against the inwardly extending annular flange 28 of the threaded retainer ring 11.

It will now become apparent by the construction just described, that since the ring member 26 bears against the end portion of the ring 24 and the latter member in turn is shouldered as at 25 against the split collar 21, the entire bonnet 17 with its packing gland assembly is carried by the flange 28 of the retainer ring 11. Further by suitably tightening the bolts 27 against the shouldered portion 28, the desired initial compression of the gasket member 15 is accomplished. Previously, this initial compression of the gasket 15, as shown in the patent above referred to, was accomplished by means of studs directly tapped into the bonnet 17. The studs were obviously subjected to extremely high temperatures with the result that such members were virtually impossible or very difficult to remove after being subjected to high temperature service. It should of course be understood that while a specific form of gasket compressing arrangement is described, the specific details of such arrangement may vary substantially from the details described. The remainder of the valve upper construction is conventional and will be briefly referred to. The yoke 29 is employed to support a rotatable yoke sleeve 31 threaded to receive the stem 6 and journaled within the yoke hub 32 within which are positioned the yoke sleeve upper and lower thrust bearings 33. The non-rotatable rising stem 6 being threadedly journaled as at 34 is thus actuated by rotation of the handwheel 35 and the yoke sleeve 31, the handwheel being held non-rotatably relative to the yoke sleeve by means of the wheel nut 36. The swivelably mounted eye bolts 22 engage a gland flange 37, the latter in turn bearing against a gland 38 for the purpose of compressing the packing 39.

With an understanding of its actual operation it will now be apparent that the essence of this invention lies in simple and effective means which have been provided for supporting a valve bonnet mounting for a pressure sealed joint and which is convenient in also providing for the initial compression of a retained gasket capable of employing a relatively simple adjustment.

It should, of course, be realized that while a plurality of studs 27 has been shown for the purpose of supporting the bonnet, the ring member 26 may also be suitably threaded annularly if desired for engagement with an inner portion of the member 11 to provide a desirable alternate bonnet supporting means.

It should further be apparent that while our disclosure herein has been particularly concerned with valves with which our joint is conveniently employed, it is equally applicable to check valves or the like avoiding the use of a stem, or to any kind of a pressure vessel in which access to the interior thereof may be provided without the necessity for cutting a welded joint or otherwise destroying or permanently modifying a part of the pressure vessel structure when disassembly becomes necessary. Accordingly, it is the desire to be limited only within the spirit of the appended claims interpreted in light of the prior art.

We claim:

1. A pressure sealed joint for a vessel comprising a casing having an opening therein, an axially movable bonnet member within the said opening, retainer means mounted within the said opening, the said casing having an inner portion of the opening with a gasket receiving surface, a gasket therefor, an annular member, means on the said bonnet member for mounting said annular member, shouldered means on the said bonnet annularly disposed relative thereto, a second annular member on said bonnet member abutting the first named annular member, the said second named annular member having projecting means for bearing against the said retainer means whereby upon actuating said latter projecting means the bonnet member is moved axially and the said gasket is initially compressed.

2. In a pressure sealed joint, the combination including a casing having an opening therein, an axially movable bonnet member within the said opening, retainer means fixedly mounted within the said opening, a gasket fitted between the said bonnet and retainer means, an annular member mounted on the said bonnet member, shouldered means on said bonnet for locating the said annular member, a second annular member shouldered against the first named annular member, the said second named annular member having threaded means bearing against an upper surface of the said retainer means whereby upon actuating said latter threaded means the said gasket is initially compressed.

3. A pressure sealed joint comprising a hollow casing having an opening therein, an axially movable bonnet member within the said opening, retainer means superposed above the bonnet member and fixedly mounted within the said opening, a gasket within the opening between the bonnet and retainer means, an annular member mounted on the said bonnet member, means on said bonnet member annularly disposed relative to said annular member for locating the latter member, a second annular member on the bonnet member abutting against the first named annular member, movable means on the second named annular member cooperating with the said retainer means whereby upon predetermined movement of the said movable means the said bonnet member is axially moved and the said gasket is compressed preliminary to the application of line pressure.

4. In means for maintaining a pressure sealed joint, the combination including a casing having an opening therein, a bonnet member predeterminedly movable within the said opening, retainer means mounted within the said opening above the said bonnet member, a gasket on the bonnet member, the said casing having an inner portion of the opening with a gasket receiving surface, means on thhe upper portion of the said bonnet member for receiving an annular member, projecting means on the said bonnet member for locating the said annular member relative to the said bonnet member, a second annular member contacting a lower end portion of the first named annular member, the said second named annular member having movable means supported by the said retainer means, the latter movable means providing upon predetermined actuation thereof for moving the said bonnet member longitudinally relative to the retainer means.

5. A joint for a pressure vessel of the character described comprising a casing having an opening therein, an axially movable bonnet member within the said opening, retainer means fixedly mounted within the said opening, the said casing having an inner portion of the opening provided with a gasket receiving surface, a gasket therefor, means on said bonnet member for mounting an annular member, shouldered means on said bonnet member annularly disposed relative thereto, a second annular member cooperating with the first named annular member, the said second annular member having axially movable means bearing against the said retainer means whereby upon actuating the said latter movable means the said bonnet member is moved and the gasket is compressed, the retainer ring having means within which said second annular member is substantially contained.

6. A pressure sealed joint comprising a casing having an opening therein, an axially movable bonnet member within the said opening, retainer means fixedly mounted within the said opening, the said casing having an inner portion of the opening with a gasket receiving surface, a gasket therefor, means on said bonnet member for mounting an annular ring, shouldered means on said bonnet member annularly disposed relative thereto, a second annular member shouldered against the first named annular member, the said second named annular member having movable means for bearing against an inner shouldered portion of the said retainer means whereby upon actuating said movable means the said retainer means is moved axially relative to the said bonnet member.

7. A pressure sealed joint comprising a casing having an opening therein, an axially movable bonnet member within the said opening, retainer means for the bonnet member fixedly mounted within the said opening, a gasket positioned between the said bonnet member and said retainer means and contacting a portion of the casing opening, an annular member above the retainer means, means on the said bonnet member for mounting said annular member, removable shouldered means on the said bonnet member, a second annular member abutting against an upper surface portion of the first named annular member, the said second named annular member having means for moving respectively the said bonnet retainer means, the first named annular member and the bonnet member substantially simultaneously.

8. The combination of a pressure sealed joint, a casing having an opening therein, an axially movable closure within the said opening, retainer means for the closure mounted within the said opening, the said closure projecting through the said retainer means, the said casing having a portion of the opening provided with a gasket receiving surface, a gasket contacting the said latter surface and having annular contact with the said closure and retainer means, an annular member mounted on the said closure, split means on said closure annularly disposed relative to the annular member, a second annular member cooperating with the first named annular member, rotatable means on the said second named annular member bearing against the said retainer means whereby upon actuation of said rotatable means the said gasket may effect a pressure seal between the said casing, closure and retainer means.

9. In a mounting for a pressure sealed joint, the combination comprising a casing having an opening therewithin, a bonnet member or the like within the opening, a retainer ring engaging a porton of the walls of the casing opening, gasket means supported by the said bonnet and compressible between the said bonnet and retainer ring to engage an annular portion of the wall of the casing opening, an annular member supported by the said retainer ring, a collar member engaging an upper portion of the said bonnet member, the said latter member having a removable shouldered portion serving as a stop for limiting the movement of the respective annular and collar members in one direction, means on the annular member bearing against the retainer ring to hold the said bonnet, retainer and collar members against the said stop.

10. Means for mounting a pressure sealed joint, the combination including a casing having an opening therewithin, a closure within the opening having a neck portion, an annular retainer member in superposed relation to the said closure, sealing means between the closure and retainer members bearing on an annular portion of the casing opening, an annular member surrounding the said neck portion of the closure, a superposed collar on the said closure, means on the annular member to maintain the latter member spaced apart relative to the said retainer member, stop means engaging the closure above the said collar to form a shoulder for the said collar and against which the said collar abuts to hold the said sealing means in fluid sealing relation relative to the casing opening upon suitable actuation of the said means on the annular member to maintain the latter member in said spaced apart relation.

RICHARD FENNEMA.
FRANCIS J. CANTALUPO.

REFERENCES CITED

The following references are of record in the file of this patent:

UNITED STATES PATENTS

| Number | Name | Date |
| --- | --- | --- |
| 192,658 | Powell | July 3, 1877 |
| 2,330,130 | Marburg | Sept. 21, 1943 |